United States Patent [19]

Stevens

[11] Patent Number: 4,554,673

[45] Date of Patent: Nov. 19, 1985

[54] SEQUENTIAL DATA TRANSMISSION SYSTEM WITH RESYNCHRONIZATION

[75] Inventor: Reginald W. Stevens, Stockport, England

[73] Assignee: International Computers Limited, London, England

[21] Appl. No.: 467,305

[22] Filed: Feb. 17, 1983

[30] Foreign Application Priority Data

Feb. 19, 1982 [GB] United Kingdom ................. 8205015

[51] Int. Cl.[4] ............................................. H04J 3/06
[52] U.S. Cl. ...................... 375/118; 370/86; 375/36
[58] Field of Search ............. 375/107, 118, 36; 328/63, 72; 370/100, 103, 85, 86, 88; 340/825.2

[56] References Cited

U.S. PATENT DOCUMENTS

| 3,597,549 | 8/1971 | Farmer | 375/107 |
|---|---|---|---|
| 3,601,543 | 8/1971 | Maniere | 370/86 |
| 3,684,837 | 8/1972 | Hartmann | 370/103 |
| 3,919,484 | 11/1975 | Maxemchuk | 370/79 |
| 4,035,770 | 7/1977 | Sarle | 340/147 |
| 4,232,385 | 11/1980 | Hara et al. | 455/610 |
| 4,270,183 | 5/1981 | Robinson et al. | 375/118 |
| 4,306,304 | 12/1981 | Baxter et al. | 370/86 |
| 4,334,305 | 6/1982 | Girardi | 370/86 |
| 4,393,497 | 7/1983 | Cantwell, Jr. | 370/86 |

OTHER PUBLICATIONS

IBM Technical Disclosure Bulletin, vol. 25, No. 2, Jul. 1982, Gfeller, et al., "Active Distribution Panels for Connecting Stations To . . . etc."
Seventh Euromicro Symposium on Microprocessing and Microprogramming, Sep., 1981, pp. 83-89, Giozza, et al., "Fiber Optics Polyvalent Local Network".
International Conference on Communications, Jun. 1984, pp. 7A-1-7A-4, White, et al., "An Experimental TDM Loop Exchange".
IBM Technical Disclosure Bulletin, vol. 17, No. 9, Feb., 1975, Widmer, "Interface Between Terminal and Repeater".
IBM Journal of Research and Development, Nov. 1970, pp. 662-667.

Primary Examiner—Robert L. Griffin
Assistant Examiner—Stephen Chin
Attorney, Agent, or Firm—Lee, Smith & Zickert

[57] ABSTRACT

A data transmission system is formed from a series of data transmission loops (2). Each loop includes an interface unit (3) for an attached device and is connected at either end to a synchronizing and switching module (5) in a central unit. The loops (2) are connected by the modules (5) into a continuous data-transmission path connecting the interface units in sequence.

The interface units 3 each acts as a synchronous repeater and/or a source of fresh data. To prevent the accumulation of jitter in the clock signals derived in the interface units each module (5) contains a first-in first-out buffer (25) in which the data is resynchronized to a common clock source (7) used by all the modules. The modules (5) also bypass any loop which contains an inoperable unit over a link (35).

6 Claims, 6 Drawing Figures

SEQUENTIAL DATA TRANSMISSION SYSTEM WITH RESYNCHRONIZATION

BACKGROUND OF THE INVENTION

This invention relates to data transmission systems of the kind that allow a number of devices to communicate with one another over a network of transmission links. Such networks can be classified into a number of different types, depending on the way the links are arranged. This invention is concerned in particular with the type in which the links are joined end to end to provide a single continuous path for the flow of data, for example round a ring or loop.

Commonly each device is connected to such a network through an interface unit which transfers information to the device from the network or vice versa. The interface units are connected to one another by the individual transmission links of the network. It is normally necessary for each interface unit to derive a clock signal from the information it receives on its incoming link and use it to control the transmission of information onto its outgoing link. Any such derived clock signal is liable to jitter and with a sequential arrangement of interface units such as has been described this jitter accumulates to give rise to timing difficulties which can limit the number of interface units it is possible to interconnect. Timing variations can also arise from changes in the physical lengths of the transmission links, caused for example by changes in temperature.

SUMMARY OF THE INVENTION

This invention provides a data transmission system comprising a continuous path for the transmission of data in which path are interposed a plurality of interface means each for transferring data from the path to an associated device, and/or from an associated device to the path, each interface means having means for deriving a clock signal from data received from the path and means responsive to that clock signal and capable of outputting onto the path data received from it, and characterised in that there is provided a source for a clock signal and means at a plurality of points on the path for resynchronising the data being transmitted on the path at each of those points to clock signals from the said source.

The synchronising means resynchronises the data to a common standard, and hence prevent timing variations from accumulating along the whole length of the network.

The invention also provides a coupling device suitable for use as the coupling means in a system according to the invention.

BRIEF DESCRIPTION OF THE DRAWINGS

An example of a system in accordance with the invention will now be described in greater detail by way of illustration with reference to the accompanying drawings, in which.

DESCRIPTION OF THE PREFERRED EMBODIMENT

Outline of the system

Figure 1:
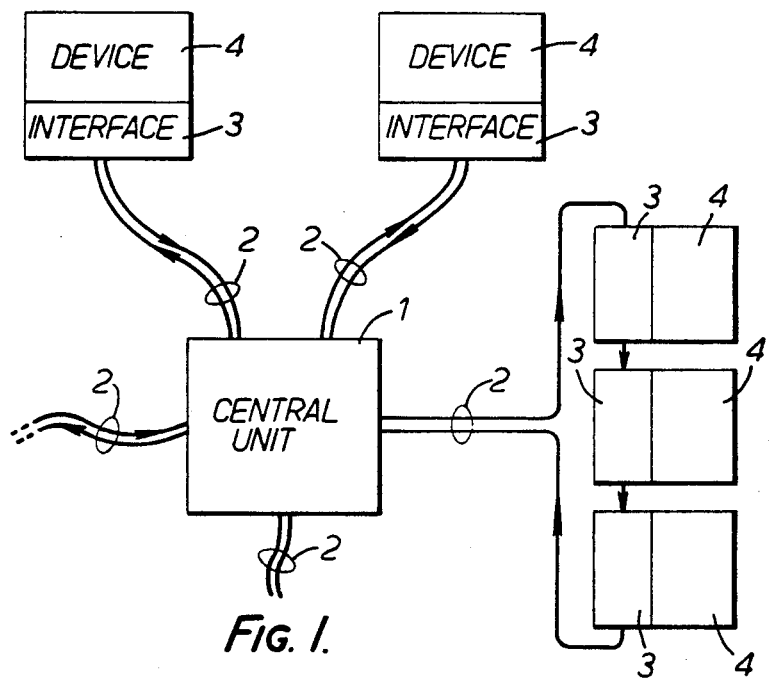
FIG. 1 is a block diagram of the overall system.

Referring to FIG. 1, the system to be described allows a number of devices to communicate by a network using optic fibres. Optic fibres permit a very high rate of data transmission with at the same time a very low error rate owing to their freedom from the effects of electromagnetic interference. The network has a physical layout of the star type, but for data flow it is organised as a ring with a single continuous path around which data can circulate.

The network has a central unit 1 from which radiate a number of transmission loops 2. Each loop has an outward and an inward leg each consisting of a single strand of optic fibre over which data is transmitted in a bit-serial self-clocking form. It also contains one or more interface units 3 which normally act as repeaters for the data on the loop, but can instead transmit data onto the loop in the place of the data they receive. Each interface units 3 is connected to one of the devices 4 which communicate with one another over the network.

The devices 4 may be any suitable digital equipment. For example, the network is especially suitable for a system in which the devices 4 are all computer processors, or are one or more computer processors and one or more high-speed peripherals such as disc units. A device 4 need not itself be the user or provider of data; it may be a controller attached to several such devices or a gateway device to another network.

Figure 2:
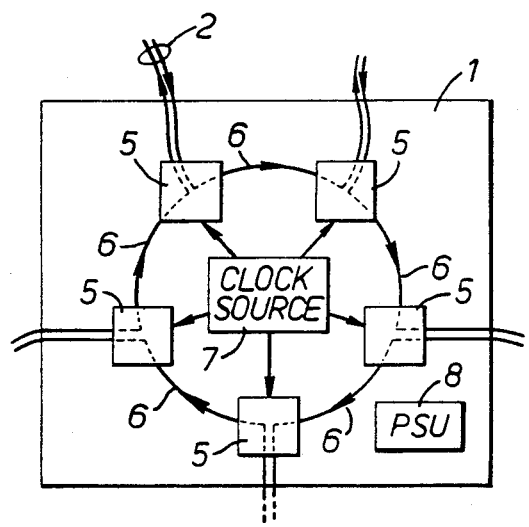
FIG. 2 is a block diagram of the central unit of the system.

Referring to FIG. 2, each transmission loop 2 is connected in the central unit 1 to a switching and synchronising module 5. These modules are connected in a ring by data-transfer links 6 and are controlled by clock signals from a common source of clock signals 7. The central unit 1 has a power supply unit 8.

In normal operation each module 5 connects its incoming link 6 to the outgoing leg of its transmission loop 2 and the incoming leg of its transmission loop 2 to its outgoing link 6, as shown by the dotted lines. There is thus a complete circular path for data flow through all the interface units 3.

One function of the modules 5 is to resynchronise the data signal arriving on its transmission loop 2 to a common timing standard derived from the clock source 7 before passing the signal to the next module 5. In this manner the effects of any clock jitter introduced in the loop are removed, as are timing variations caused by changes in the length of the loop.

The other function of the modules 5 is to ensure the integrity of the system if one of the units should fail or be switched off. Each module 5 monitors the presence of a signal arriving on the inward leg of its transmission loop 2 and if it detects that the signal is absent it short-circuits the loop by providing a data connection between its incoming and its outgoing link 6. Hence the integrity of the ring-path for data is maintained even when a device removes itself from the network or a fault occurs in a loop.

Synchronising and switching module

Figure 4:
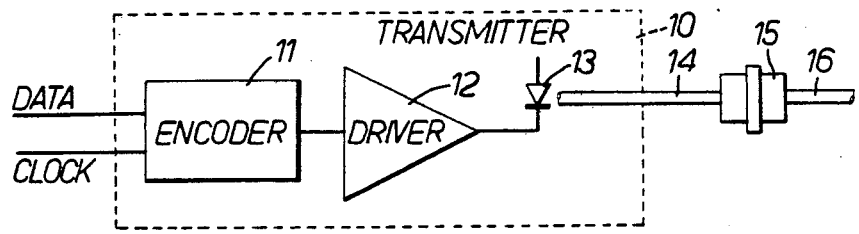
FIG. 4 is a block diagram of a transmitter as used in the system.
Figure 5:
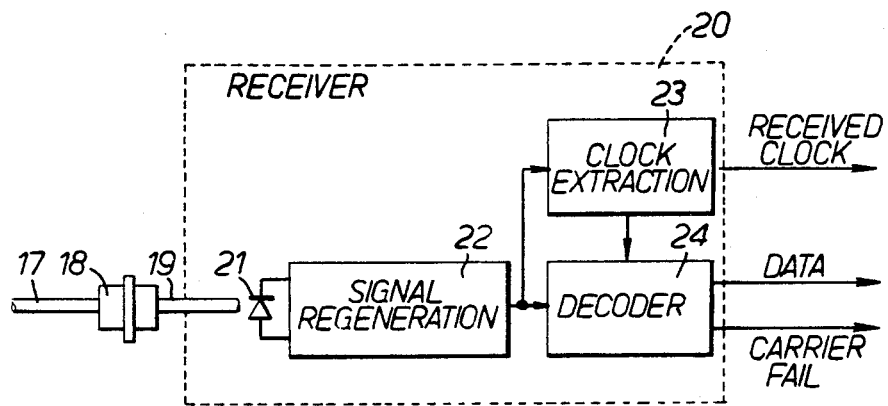
FIG. 5 is a block diagram of a receiver as used in the system.
Figure 6:
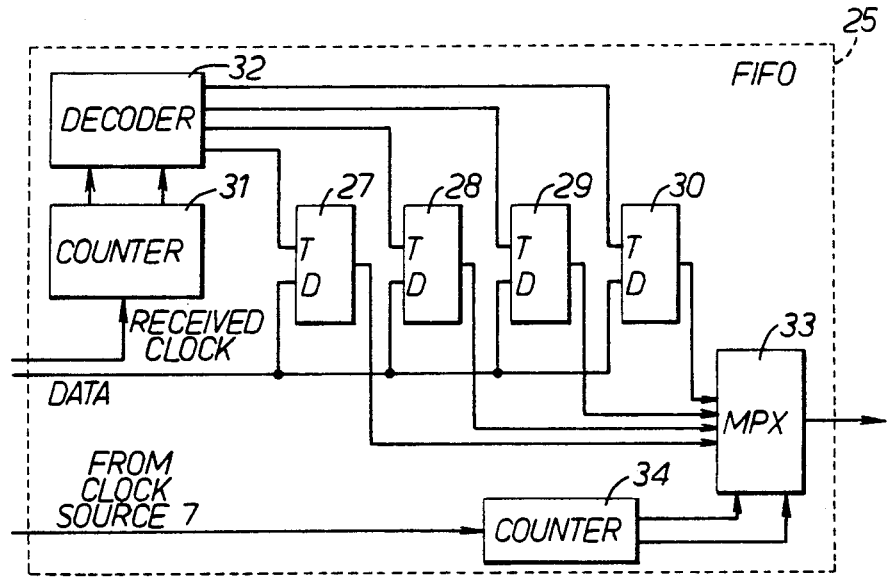
FIG. 6 is a block diagram of the first-in first-out buffer of each switching module.

The synchronising and switching modules 5 will now be described in greater detail with reference to FIG. 3, which shows one module 5 and its associated loop 2, and FIGS. 4 to 6, which show elements of the module in more detail.

Figure 3:
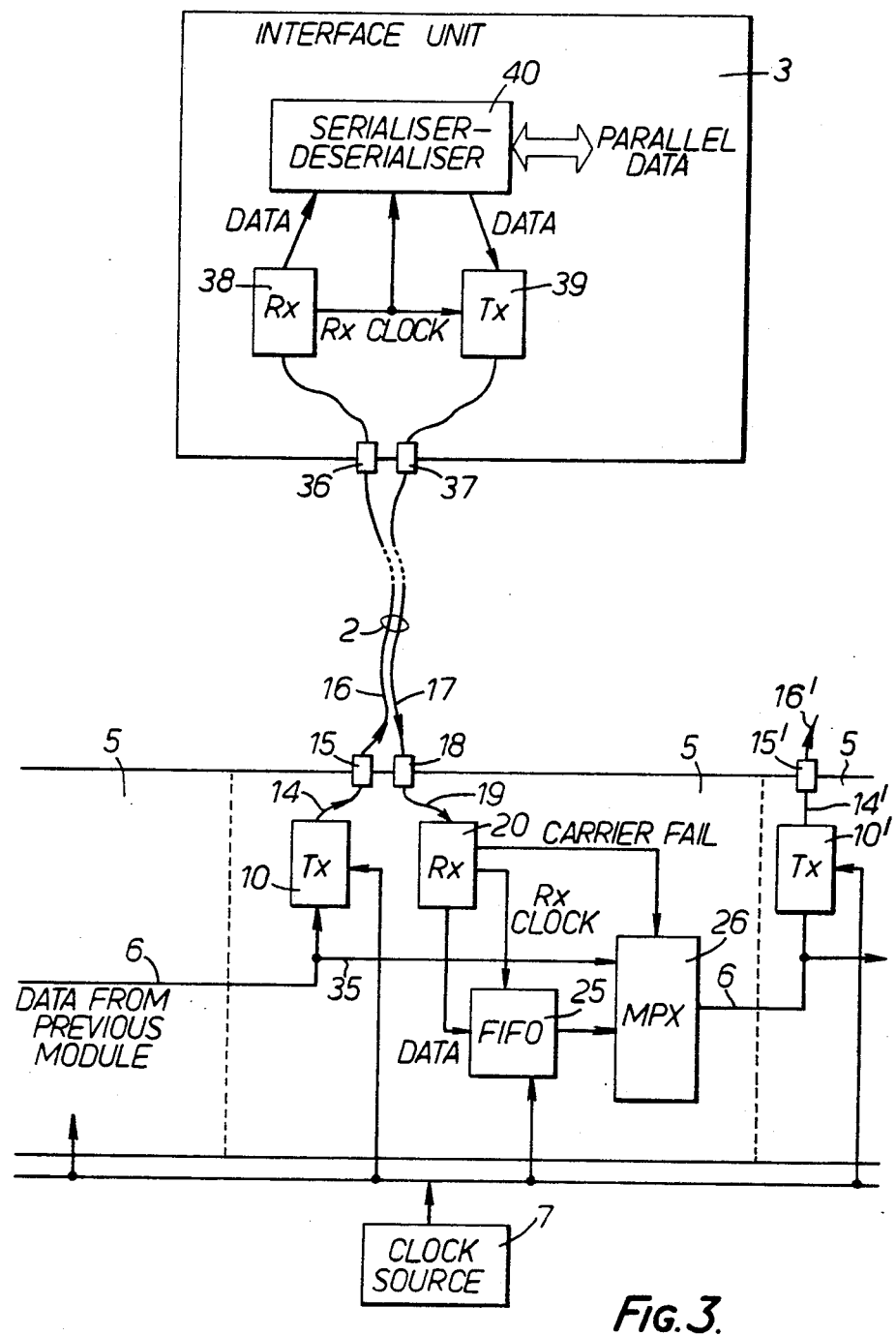
FIG. 3 is a block diagram of one of the synchronising and switching modules and its asociated transmission loop.

Referring to FIG. 3, data enters each module 5 through its incoming link 6 as a bit-serial non-return-to-zero (NRZ) signal and passes to a transmitter 10.

In the transmitter 10 (see FIG. 4) the data is encoded by an encoder 11 into a bit-serial self-clocking code. One convenient format uses phase encoding, in which there is a transition at a predetermined time in each bit cell and the sense of this transition represents the value of the bit, additional transitions being introduced midway between these transitions if needed. Alternatively other self-clocking formats, for example "Manchester" encoding, may be used. In order to perform the encoding the encoder 11 is also supplied with a clock signal from the clock source 7. The encoded data from the encoder 11 passes to a driver 12 which drives an optical source such as an LED 13. The LED 13 emits an optical signal in which the light is modulated in accordance with the encoded data signal. This optical signal is introduced into a so-called fibre-optic "pigtail" 14.

The pigtail 14 is attached to an optical connector 15 which is mounted on the housing of the central unit 1 and is also attached to an optic fibre 16 which (referring again to FIG. 3) forms the outward leg of the transmission loop 2 associated with this switching module 5. This fibre may, for example, be a 20 MHz.Km fibre. The return leg of the transmission loop 2 is a similar optic fibre 17. It is attached to an optical connector 18 connected by a pigtail 19 to a receiver 20.

In the receiver 20 (see FIG. 5) the optical signal is converted to an electrical signal by an element such as a PIN diode 21 and regenerated by a signal regeneration circuit 22. Its output passes to a clock extraction circuit 23 in which, by use of a phase-locked loop, a received clock signal is derived from the received data. The output of the circuit 22 also passes to a decoder 24 in which, in response to the received clock signal, the data is reconverted to NRZ form. It also outputs a "carrier fail" signal if it detects the absence of a received signal.

Referring again to FIG. 3, the data output by the receiver 20 is clocked into a first-in first-out (FIFO) buffer 25 by the received clock signal and the data is then clocked out of the FIFO 25 by the clock signal produced by the common source 7 and passed through a multiplexer 26 to the outgoing link 6 to the next module.

In the FIFO 25 (see FIG. 6) the received clock signal clocks the data from the receiver 20 into a group of bistables 27 to 30, shown as four by way of example. The received clock signal is converted by a counter 31 and decoder 32 into signals which trigger each bistable in turn in a cyclic order, so that successive bits in the received data are stored in successive bistables. The outputs of the bistables are connected to a multiplexer 33 and each output in turn is selected to be output from the FIFO 25 in response to the signals from the clock source 7, applied through a counter 34.

In effect the inputs of the bistables 27 to 30 are scanned cyclically by the received clock and their outputs are scanned cyclically by the signals from the clock source 7. Any individual bit in the received data is stored in the bistable that has been reached by the input scan at the time of its arrival and remains there until that bistable is next reached by the output scan.

Referring again to FIG. 3, the line carrying the "carrier fail" signal from the receiver 20 is connected to the multiplexer 26. If the receiver 20 fails to detect an incoming optic signal on the optic fibre 17 the "carrier fail" signal is produced and causes the multiplexer 26 to switch to allow data to pass straight from the incoming link 6 to the outgoing link 6 on a link 35. The loop 2 connected to this module is therefore by-passed completely and data passes straight from the preceding to the following module 5.

It will be seen that a data-transfer connection runs from the connector 18, attached to the incoming leg of one loop via the receiver 20, FIFO 25 and multiplexer 26 to the transmitter 10' in the next module 5 and then to the connector 15' attached to the outward leg of the next loop 2.

Interface unit

Referring again to FIG. 3, the outward and inward legs 16 and 17 of the transmission loop 2 shown in that figure end at optical connectors 36 and 37 respectively mounted on one of the interface units 3. The optical connectors 36 and 37 are connected by pigtails respectively to a receiver 38 and transmitter 39 similar to those in the module 5.

From the signal transmitted over the leg 16 of the loop 2 the receiver 38 recovers a received (Rx) clock signal and an NRZ data signal. Both pass to a serialiser-deserialiser 40, where, if the associated device is not transmitting, the incoming bits are received serially and output in parallel as bytes or words to the associated device. The associated device therefore receives all the data and can select that addressed to itself. At the same time the serial data is returned from the serialiser-deserialiser to the transmitter 40, from which it is transmitted using the received clock signal derived by the receiver 38. The interface unit 3 therefore acts as a repeater for the received data so as to close the data path round the loop 2.

On the other hand, if the associated device is transmitting, the received data is discarded although the received clock signal is still used by the serialiser-deserialiser 40 and transmitter 39. The associated device supplies the data to be transmitted in parallel to the serialiser-deserialiser 40, from which its is clocked out serially and passed to the transmitter 39. The signal is then transmitted onto the inward leg 17 of the loop 2, although now different from that on the outward leg 16 is therefore still in synchronism with it.

If a transmission loop includes more than one interface unit 3 the optic fibre from the output optical connector 37 of the first runs to the input optical connector 36 of the next, and so on until the last, whose output connector 36 is connected to the return leg of the loop.

General operation

As has been explained, derived clocks such as those produced in the receivers of the interface units are liable to jitter which will tend to accumulate from one unit to the next. This jitter is eliminated in the synchronising and switching modules 5 by the act of clocking the data out of each FIFO 25. At this point the data signal is resynchronised to the common clock source 7. It is therefore possible, by having a sufficient number of synchronising and switching modules 5, to have a network whose number of communicating devices is not limited by the need to keep jitter within tolerable bounds.

The phase relationship between the data dispatched onto the outward leg 16 of the transmission loop 2 and that received from the inward leg 17 is arbitrary. The FIFO 25 prevents misclocking whatever the relationship. It also accommodates changes in the phase relationship such as are likely to occur if the length of the transmission loop varies, for example with temperature or ageing. If such a change occurs it simply leads to a change in the lag between the input and output scans of the bistables 27–30, but the data output from the FIFO 25 remains in synchronism with the clock source 7.

With four bistables it is convenient to set this lag to two bits initially, which allows a timing change of up to two bits in either direction. Of course, if greater variations are expected, more than four bistables may be used to reduce the danger of both scans pointing at the same bistable.

A network in the form of a closed ring, that is, one in which it is possible for data to make a complete circuit and continue on round the ring again if no other device is transmitting, must contain on it an integral number of bits. The FIFOs 25 ensure that this criterion is met even when changes occur in the length of the ring without the need to introduce a separate device to ensure bit-level synchronisation round the ring.

When one of the devices 4 is switched off its interface ceases to be powered and though a signal will continue to be received from the optic fibre 16 it will not be regenerated or replaced with different data by the transmitter 31. That leads, as has been explained, to the short-circuiting of the loop 2 by the link 35.

The data that is then passed along the path 35 to the next module 5 has been synchronised to the clock source 7 in the preceding module 5, so later units do not lose clock synchronism even though the ring has been shortened by an arbitrary amount. Similarly, when a loop is switched back into the ring synchronisation is maintained by the FIFOs 25.

The data output onto any loop 2 receives a final resynchronisation to the clock signal from the source 7 in the transmitter 10.

Any suitable access control method may be used to ensure that only one device 4 transmits onto the ring at any one time. Examples are token passing and synchronous time-division multiplexing.

The following describes one example of a procedure for bringing the system into operation. The central unit 1, when first powered up, starts by transmitting onto each outward leg 16 via each multiplexer 26 a pattern which the allows clock to be recovered by each operational interface unit. For phase encoding a suitable pattern is alternating 1s and 0s. When all operational interface units have aquired synchronisation and started relaying the pattern they receive the central unit 1 reverts to normal operation and the attached devices are able to start transmitting to one another according to the higher-level protocol in use.

Even though clock synchronism is maintained when devices join or leave the ring spurious data signals can arise from the resulting change in the length of the data path. In order to avoid their being misinterpreted by the higher levels it may be desired to clear the ring of data at such a time. Thus the central unit 1, when it detects a change in the state of any carrier-fail signal, may carry out a reset procedure in which it broadcasts the synchronising pattern on each outward leg 16 in the same way as described for start-up. Alternatively higher-level procedures may be relied on in the well known way to detect errors and recover from them. In that case, if token-passing is being used as the access-control mechanism it is convenient to synchronise the instant at which a device intentionally joins or leaves the ring with the receipt of a control token. At such a time there will be no useful data on the ring.

A reset procedure such as described above may be invoked if a clash occurs in any of the FIFOs 25 because the scans have come to point to the same bistable. At the same time the difference between the scans in all the FIFOs will be reset to its mid value.

If a loop contains more than one interface unit 3, if any of them ceases to operate, all will be removed from the ring. That, however, can be perfectly satisfactory if the devices are used as a group.

Various parts of the central unit may be constructed by large-scale integration, for example the individual modules 5 or (as a single circuit) the set of modules together with the clock source. It may be convenient to omit the optical receivers and transmitters from the integrated elements.

The central unit is in any case small in comparison with the lengths of the loops, which may typically, depending on the fibre, range from some meters to a kilometer or more.

Modifications

It is convenient for the transmitter and receiver in the modules to use the same design as those in the interface units, but if desired the data in the modules 5 can remain in self-clocking format, the encoder and decoder being omitted from the transmitter 10 and receiver 20.

For high date rates the receivers may output clock and NRZ data in a two-phase form. The clock signal is split into two half-rate signals in antiphase with one another and the data is split into two signals one the result of strobing the data with one of these clock signals and the other the result of strobing it with the other of these clock signals. In the serialisers/deserialisers 40 the two phases of data are combined by strobing each with its own phase of clock signal. This arrangement increases the latitude to timing uncertainties such as are especially likely to occur if a fast form of logic such as ECL is used in the receivers and conversion takes place to levels suitable for a slower form of logic such as TTL which is used in the serialiser/deserialisers 40. Data may then similarly be returned from the serialiser/deserialisers 40 to the transmitters 39 in two-phase form.

If the ring uses an empty-slot control mechanism its length may be required to hold an integral number of frames. A first-in first buffer may be included in the ring to ensure this criterion requirement is met, data being both clocked in and clocked out by the common source 7. Bit-level synchronisation will still be carried out by the individual FIFOs 25.

The network may contain one or more stretches of metal conductor as the transmission medium if suitable encoder/decoders are included. Especially in this case integrity of the ring may be assured by by-passes in the interface units rather than the central unit. If a device is required to receive only its interface unit need not be capable of acting as more than a repeater and receiver If the amount of jitter created is acceptable it can be possible to omit the FIFOs from the connections between some of the pairs of loops.

As an alternative to a closed ring the network may be an open loop, that is run from one device (e.g. a loop controller) back to that device without a through path for data through that device.

In the arrangement so far described the source 7 generates its clock signal from, for example, a crystal oscillator. In an alternative arrangement it derives the clock signals used in the central unit 1 from the incoming signal from one transmission loop 2. That loop's module 5 is modified to omit the FIFO 25. By this means a number of central units 1, each with its own loops 2 to associated devices, can themselves be connected to form an overall data ring. One central unit has a master clock as its source 7, and the sources 7 of the other units 1 follow that clock as slaves. All the loops of the central unit with the master clock will form part of a path according to the invention. For the other central units the path according to the invention will exclude the loop from which the unit derives its clock signal.

I claim:

1. A data transmission system comprising
   (a) a plurality of interface units, each comprising input means for receiving an input self-clocking signal and recovering a local clock signal and an input data signal therefrom, and output means for combining the recovered lock clock signal with an output data signal to produce an output self-clocking signal,
   (b) clock means for generating a master clock signal,
   (c) a plurality of resynchronisation means each connected to the clock means to receive the master clock signal, each resynchronisation means comprising means for receiving an input self-clocking signal and for resynchronising it to produce an output self-clocking signal synchronised to the master clock signal, and
   (d) data transmission means for connecting the interface units and resynchronisation means together in series, with each resynchronisation means positioned between a different pair of interface units in said series, the output self-clocking signal of each interface unit in said series being connected to the next resynchronisation means in the series to provide said input self-clocking signal therefor, and the output self-clocking signal of each resynchronisation means being connected to the next interface unit in the series to provide said input self-clocking signal therefor.

2. A system according to claim 1 wherein each resynchronisation means comprises input means for receiving the input self-clocking signal and recovering a clock signal and data signal therefrom, a first-in-first-out buffer, means responsive to the recovered clock signal for writing the recovered data into successive locations of the buffer, and means responsive to the master clock signal for reading data out of successive locations of the buffer to produce the output self-clocking signal.

3. A system according to claim 1 wherein the resynchronisation means are physically grouped together in a central unit along with said clock means, the interface units being physically remote from the central unit and connected thereto by said data transmission means.

4. A system according to claim 3 wherein said central unit further includes means for selectively by-passing said interface units.

5. A system according to claim 3 wherein said data transmission means comprises a plurality of optical-fibre data transmission links.

6. A data processing system comprising a data transmission system according to claim 1 and a plurality of data processing devices connected respectively to the interface units.

* * * * *